(12) United States Patent
Sibert

(10) Patent No.: US 7,058,805 B2
(45) Date of Patent: Jun. 6, 2006

(54) SYSTEMS AND METHODS FOR PROTECTING DATA SECRECY AND INTEGRITY

(75) Inventor: W. Olin Sibert, Lexington, MA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 11/000,994

(22) Filed: Dec. 2, 2004

(65) Prior Publication Data

US 2005/0108555 A1 May 19, 2005

Related U.S. Application Data

(62) Division of application No. 09/478,947, filed on Jan. 6, 2000, now Pat. No. 6,832,316.

(60) Provisional application No. 60/171,851, filed on Dec. 22, 1999.

(51) Int. Cl.
*H06F 1/24* (2006.01)
(52) U.S. Cl. ..................................... 713/161; 713/169
(58) Field of Classification Search ................ 713/161, 713/169
See application file for complete search history.

(56) References Cited

U.S. PATENT DOCUMENTS

| | | | |
|---|---|---|---|
| 3,798,359 A | 3/1974 | Feistel | |
| 4,827,508 A | 5/1989 | Shear | |
| 4,977,594 A | 12/1990 | Shear | |
| 5,050,213 A | 9/1991 | Shear | |
| 5,410,598 A | 4/1995 | Shear | |
| 5,530,235 A | 6/1996 | Stefik et al. | |
| 5,534,975 A | 7/1996 | Stefik et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,999,949 A | 12/1999 | Crandall | |

(Continued)

FOREIGN PATENT DOCUMENTS

EP       0 715 247 A1     6/1996

(Continued)

OTHER PUBLICATIONS

Biham, E., *Cryptanalysis Of Multiple Modes Of Operation*, Proceedings of ASIACRYPT '94 (LNCS 950), Springer-Verlag, New York, NY, pp. 278-292.

(Continued)

*Primary Examiner*—Thomas R. Peeso
(74) *Attorney, Agent, or Firm*—Finnegan, Henderson, Farabow, Garrett & Dunner, L.L.P.

(57) ABSTRACT

A technique for integrating message authentication with encryption and decryption is disclosed. Intermediate internal states of the decryption operation are used to generate a validation code that can be used to detect manipulation of the encrypted data. The technique is optimized with respect to processing time, execution space for code and runtime data, and buffer usage. The technique is generally applicable to a variety of block ciphers, including TEA, Rijndael, DES, RC5, and RC6.

27 Claims, 17 Drawing Sheets

U.S. PATENT DOCUMENTS

| | | | |
|---|---|---|---|
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,389,402 | B1 | 5/2002 | Ginter et al. |
| 6,427,140 | B1 | 7/2002 | Ginter et al. |
| 6,449,367 | B1 | 9/2002 | Van Wie et al. |
| 6,618,484 | B1 | 9/2003 | Van Wie et al. |
| 6,640,304 | B1 | 10/2003 | Ginter et al. |
| 6,658,568 | B1 | 12/2003 | Ginter et al. |
| 6,668,325 | B1 | 12/2003 | Collberg et al. |
| 6,785,815 | B1 | 8/2004 | Serret-Avila et al. |
| 6,832,316 | B1 | 12/2004 | Sibert |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |

FOREIGN PATENT DOCUMENTS

| | | | |
|---|---|---|---|
| WO | WO 96/27155 | A3 | 9/1996 |
| WO | WO 97/43761 | | 11/1997 |
| WO | WO 98/09209 | A1 | 3/1998 |
| WO | WO 98/10381 | | 3/1998 |
| WO | WO 98/37481 | A1 | 8/1998 |
| WO | WO 99/01815 | A1 | 1/1999 |
| WO | WO 99/24928 | A2 | 5/1999 |
| WO | WO 99/48296 | A1 | 9/1999 |
| WO | WO 00/75925 | A1 | 12/2000 |
| WO | WO 01/06374 | A2 | 1/2001 |
| WO | WO 01/09702 | A2 | 2/2001 |
| WO | WO 01/10076 | A2 | 2/2001 |

OTHER PUBLICATIONS

Biham, E., *On Modes of Operation*, Proceedings of Fast Software Encryption Workshop (LNCS 809), Springer-Verlag, New York, NY, Feb. 22, 1994, pp. 116-120.

Daemen, J. and Rijmen, V., "AES Proposal: Rijndael," Version 2 (1999), 45 pages.

Feistel, H., "Cryptography and Computer Privacy," Scientific American, V. 228, No. 5, May 1973 pp. 15-23.

Jansen, C. et al., *Modes of Blockcipher Algorithms and Their Protection Against Active Eavesdropping*, Proceedings of EUROCRYPT '87, Springer-Verlag, 1988, pp. 281-286.

Jansen, C., *Protection Against Active Eavesdropping*, Abstracts of Papers from EUROCRYPT '86, Springer-Verlag, May 20-22, 1986, pp. 1.3A-1.3C.

Jueneman, R. et al., *Message Authentication With Manipulation Detection Codes*, Proceedings of the IEEE Symposium on Security and Privacy, Apr., 1983, pp. 33-54.

Kohl, J., *The Use of Encryption in Kerberos for Network Authentication*, Advances in Cryptology CRYPTO '89, Springer-Verlag, 1990, pp. 35-43.

Menezes, A., et al, *Data Integrity and Message Authentication*, Handbook of Applied Cryptography, CRC Press, Boca Raton, FL, 1997, pp. 359-383.

Schneier, B., Applied Cryptography, $2^{nd}$ ed., 1996, pp. 206-208.

Sibert, O. et al., "DigiBox: A Self-Protecting Container for Information Commerce," Proceedings of the First USENIX Workshop on Electronic Commerce, New York, NY, Jul. 1995, 9 pages.

Sibert, O. et al., "Securing the Content, Not the Wire, for Information Commerce," InterTrust Technologies Corporation, 1996, 12 pages.

Stefik, M., "Trusted Systems," Scientific American, Mar. 1997, pp. 78-81.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Chapter 7, Classification, Introduction to Knowledge Systems," Morgan Kaufmann Publishers, Inc., 1995, pp. 543-607.

Stubblebine, S., et al., *On Message Integrity in Cryptographic Protocols*, 1992 Proceedings of the IEEE Symposium on Research in Security and Privacy, Apr., 1992, pp. 85-104.

Wagner, D., et al., *Cryptanalysis of Some Recently-Proposed Multiple Modes of Operation*, Proceedings of the Fast Software Encryption Workshop (LNCS 1372), Springer-Verlag, New York, NY, 1994, pp. 254-269.

Wheeler, D.R. et al., "TEA, A Tiny Encryption Algorithm," Fast Software Encryption: Second International Workshop, Leuven, Belgium, Dec. 14-16, 1994, Proceedings, Springer-Verlag, LNCS 1008.

SYSTEMS AND METHODS FOR PROTECTING DATA SECRECY AND INTEGRITY

RELATED APPLICATIONS

This is a division of application Ser. No. 09/478,947, filed Jan. 6, 2000, now U.S. Pat No. 6,832,316, and claims the benefit of U.S. Provisional Patent Application No. 60/171,851, entitled "Systems and Methods for Protecting Data Secrecy and Integrity," filed Dec. 22, 1999, both of which are hereby incorporated by reference.

COPYRIGHT AUTHORIZATION

A portion of the disclosure of this document contains material that is subject to copyright protection. The copyright owner has no objection to the facsimile reproduction of the patent document or the patent disclosure as it appears in the Patent and Trademark Office files or records, but otherwise reserves all copyrights whatsoever.

FIELD OF THE INVENTION

The present invention relates generally to data communication and storage. More specifically, systems and methods are disclosed for integrating the protection of data secrecy with the protection of data integrity.

BACKGROUND OF THE INVENTION

In secure communication and storage applications, it is often desirable to protect both the secrecy and the integrity of information in order to ensure that neither unauthorized disclosure nor undetected modification occurs. For example, if the integrity of an electronic communication is protected, but not its secrecy, an attacker can intercept the communication and make free use of the information contained therein. Similarly, if the secrecy of a communication is protected, but not its integrity, an attacker can intercept the communication and alter it in a way that subverts the purpose of the communication. For example, if the communication consists of an encrypted software program, an attacker could intercept the ciphertext version of the program during transmission and modify it in a way that causes it to fail or to perform unwanted or malicious operations. Without a way to detect such modifications, the recipient (and the sender) will be unable to prevent execution of the corrupted program, and the recipient may attribute the faulty or malicious behavior of the program to poor workmanship or malicious intent on the part of the author or distributor. One of ordinary skill in the art will appreciate that there are other situations in which it is advantageous to preserve both the secrecy and the integrity of a communication.

Conventional techniques typically use two independent mechanisms to provide secrecy and authentication. For example, an encryption algorithm may be used to protect secrecy, and a separate cryptographic checksum or message authentication code may be used to detect modifications. A commonly employed solution is to use the Data Encryption Standard (DES) algorithm in Cipher Block Chaining (CBC) mode for secrecy protection, and a DES-CBC Message Authentication Code (MAC) to provide integrity protection or validation, using different cryptographic keys for each process to prevent straightforward attacks on the DES-CBC MAC.

FIGS. 1A and 1B illustrate this conventional approach. Referring to FIG. 1A, the sender of a message encrypts the plaintext form of the message 10 using encryption function 12. In addition, the sender generates a message authentication code (MAC) 16 by applying MAC function 18 to plaintext 10. The sender combines MAC 16 with ciphertext 14, and sends the result 15 to the recipient. As shown in FIG. 1B, upon receipt of message 15' (i.e., message 15 after transmission), the recipient must first decrypt the ciphertext using decryption function 20. Decryption function 20 yields a plaintext representation of the message 22, which the recipient checks for authenticity by computing a MAC 24. MAC 24 is compared to MAC 16' (i.e., the received version of MAC 16) attached to ciphertext message 15'. If MAC 24 is equal to MAC 16', then the message is deemed to be valid.

This conventional approach has significant disadvantages, however, as it typically requires that two algorithms (i.e., one for secrecy and one for authentication) be implemented in the system, and that the protected data be processed twice. In addition, as FIGS. 1A and 1B illustrate, the conventional process requires that these two processing passes be performed by both the sender and the recipient. Moreover, even if the same basic algorithm is used for both functions, storage is still required for the runtime state of two instances of the algorithm, and twice the processing resources, as well as two different cryptographic keys in some implementations, are required to perform both functions.

A related approach is to use a cryptographic hash function, such as the Secure Hash Algorithm version 1 (i.e., SHA-1), to append a secure manipulation detection code (MDC) to the plaintext, and then to encrypt the plaintext and the MDC for secrecy protection using a block cipher such as DES. This approach is illustrated in FIGS. 2A and 2B, which show the operations performed at the message source and at the message destination, respectively. The techniques shown in FIGS. 2A and 2B are used in the Internet Protocol Security Extensions (IPSEC), and have a processing time advantage over the techniques shown in FIGS. 1A and 1B, since cryptographic hash functions are typically faster than block ciphers of similar strength. However, although this approach is faster, it can require more code space (or hardware), since it employs two distinct algorithms.

Various approaches have been suggested for eliminating the extra processing burden and the extra algorithmic cost associated with the techniques described above. For example, the error propagation properties of some modes of operation appear to provide a degree of integrity protection (validation). One such approach, Propagating Cipher Block Chaining (PCBC), was specifically designed to ensure that any manipulation of the ciphertext would damage all subsequent ciphertext. However, PCBC, like other attempts to achieve similar results, is vulnerable to relatively straightforward attacks. For example, with respect to PCBC, swapping two ciphertext blocks leaves the rest of the message unchanged.

Thus, there is a need for systems and methods that protect the secrecy and integrity of a message without consuming the time, memory, or processing resources associated with conventional approaches. In addition, there is a need for systems and methods that can provide these efficiencies without decreasing the level of security substantially below that which is offered by the conventional approaches.

SUMMARY OF THE INVENTION

The present invention provides systems and methods for efficiently protecting the integrity and the secrecy of data by integrating the integrity protection function with the internal operation of an encryption and decryption algorithm. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method for processing data in a manner designed to protect the data's secrecy and integrity is disclosed. The data are encrypted, and a validation code is generated for later use in detecting modification to the encrypted data. The encrypted data and the validation code are then transmitted to another system or to a storage device. There, the encrypted data can be retrieved and decrypted as part of an integrated process that is operable to decrypt the encrypted data and to yield a validation code. This validation code can be compared to the original validation code. If the two validation codes are not equal, this serves as an indication that the encrypted data or the original validation code was modified after the data was encrypted.

In another embodiment, a system for processing data is disclosed. The system includes a processor, a memory unit, logic for encrypting a data file, logic for decrypting the encrypted data file, and logic for receiving internal intermediate states from the decryption logic, and for using the internal intermediate state values to generate a validation code. The system may also include a mixing function for combining internal intermediate state values with an input validation value to yield an output validation value that can be used in the generation of the validation code. The mixing function can include an adder for adding a portion of the input validation value to one of the internal intermediate state values, a first shift register for shifting the adder's output by a predefined number of bits, logical exclusive-or circuitry for performing an exclusive-or operation on another portion of the input validation value and another of the internal intermediate state values, a second shift register for shifting exclusive-or circuitry's output by a predefined number of bits, and circuitry for concatenating the output from the shift registers to form an output validation value. The output validation value can be sent, along with the encrypted data, to another system or a storage device.

In yet another embodiment, a system is described for retrieving encrypted data and a validation code, and for using the validation code to check the authenticity of the encrypted data. The system includes a processing unit, a memory unit containing an encrypted file and a first validation code, decryption logic for decrypting the encrypted file, and logic for accepting a first and second intermediate state values from the decryption logic, and for using the intermediate state values to generate a second validation code. The logic for using the intermediate state values to generate a second validation code includes an adder for adding a first portion of an input validation value to the first intermediate state. The logic also includes a first shift register for shifting an output from the adder by a first predefined number of bits, the predefined number of bits being derived, at least in part, from the second intermediate state. In addition, the logic includes circuitry for calculating the logical exclusive-or of a second portion of the input validation value and the second intermediate value. The system further includes a second shift register for shifting an output from the logical exclusive-or circuitry by a second predefined number of bits, the second predefined number of bits being derived, at least in part, from the first intermediate state. Circuitry for concatenating an output from the first shift register with an output from the second shift register to form an output validation value is also included.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and the invention encompasses numerous alternatives, modifications and equivalents. For example, several embodiments are described in the context of a system and method for enhancing block ciphers—such as the Tiny Encryption Algorithm, Rijndael, RC5, RC6, and Blowfish—that are already relatively fast or small, and for which the inventive techniques are particularly effective; however, those skilled in the art will recognize that the disclosed systems and methods are readily adaptable for broader application. For example, it will be appreciated that the systems and methods of the present invention are applicable to essentially all types of cryptographic algorithms, including without limitation DES, CAST5, MARS, or Twofish, to name just a few additional examples. Moreover, while numerous specific details are set forth in the following description in order to provide a thorough understanding of the present invention, the present invention may be practiced according to the claims without some or all of these specific details. Finally, for the purpose of clarity, certain technical material that is known in the art related to the invention has not been described in detail in order to avoid unnecessarily obscuring the present invention.

Systems and methods for integrating message authentication with conventional block ciphers are described herein. The disclosed techniques are optimized with respect to processing time, execution space, and buffer usage, and are generally applicable to a variety of block ciphers. Unlike a conventional block cipher, which only produces decrypted output, the block cipher of the present invention advantageously produces both decrypted output and a validation value.

Figure 1A:
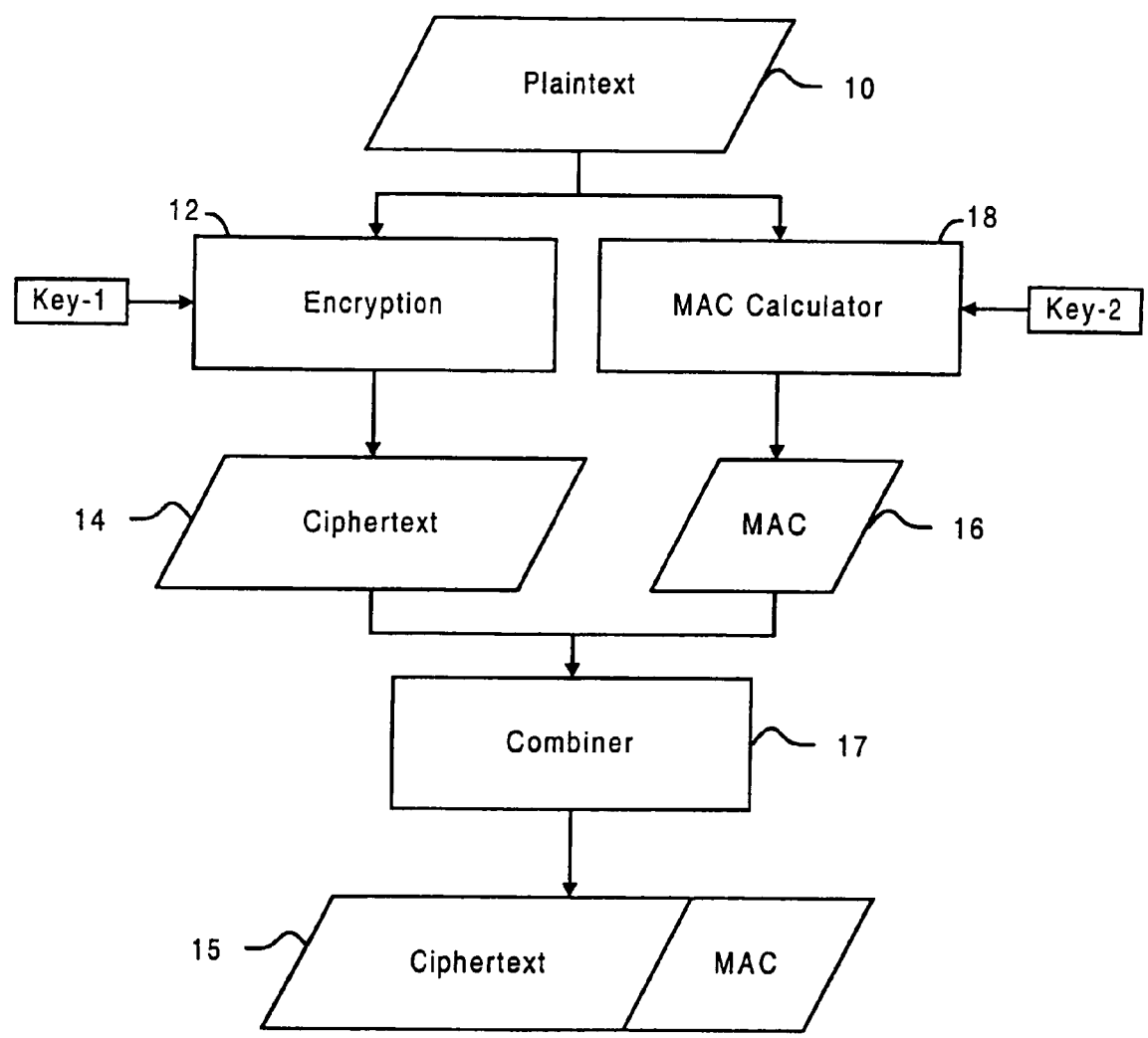
FIGS. 1A and 1B illustrate a conventional technique for encrypting and decrypting a communication, and for validating the communication with a message authentication code.
Figure 1B:
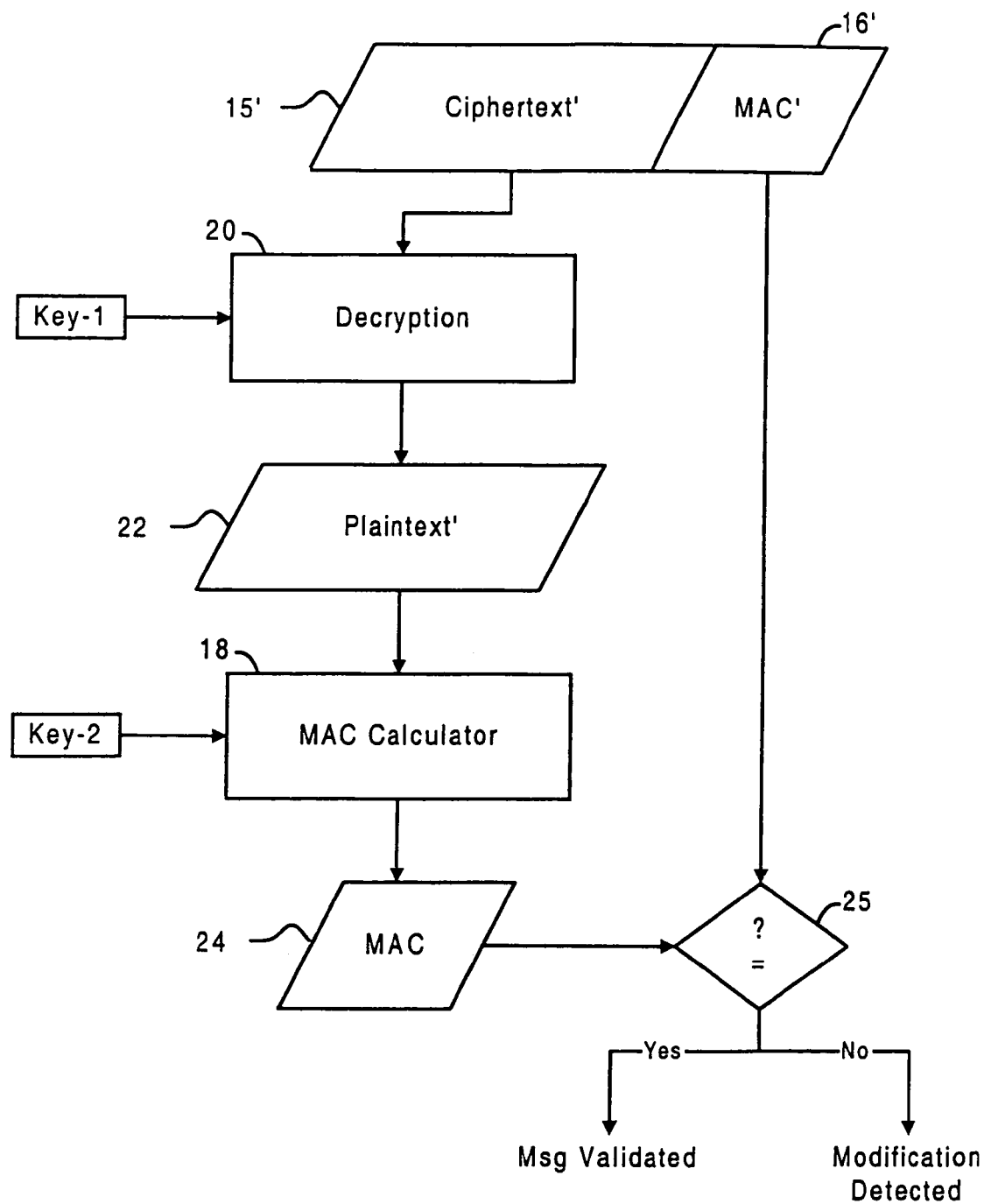
Figure 2A:
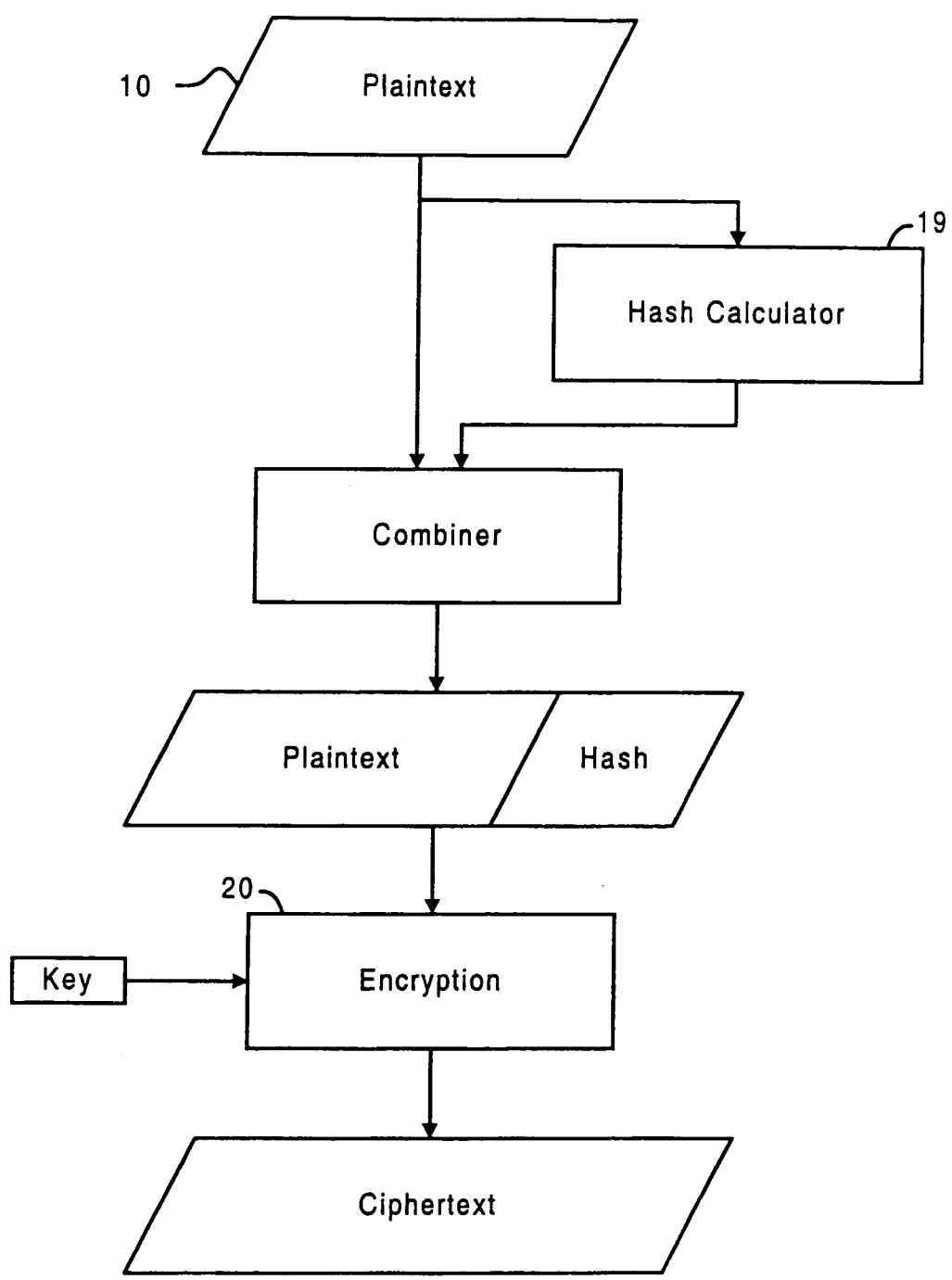
FIGS. 2A and 2B illustrate a conventional technique for encrypting and decrypting a communication, and for validating the communication with a hash value.
Figure 2B:
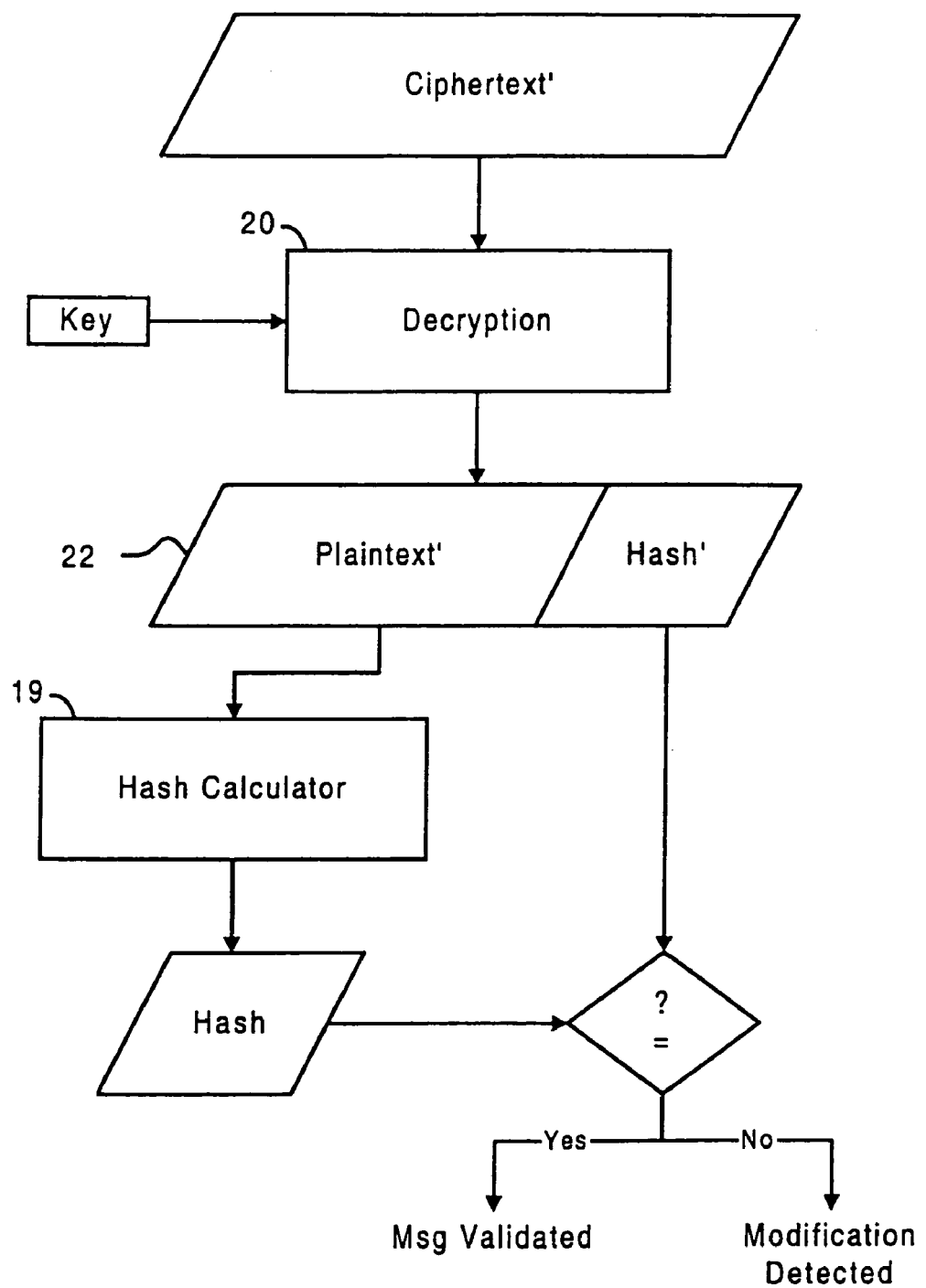
Figure 3A:
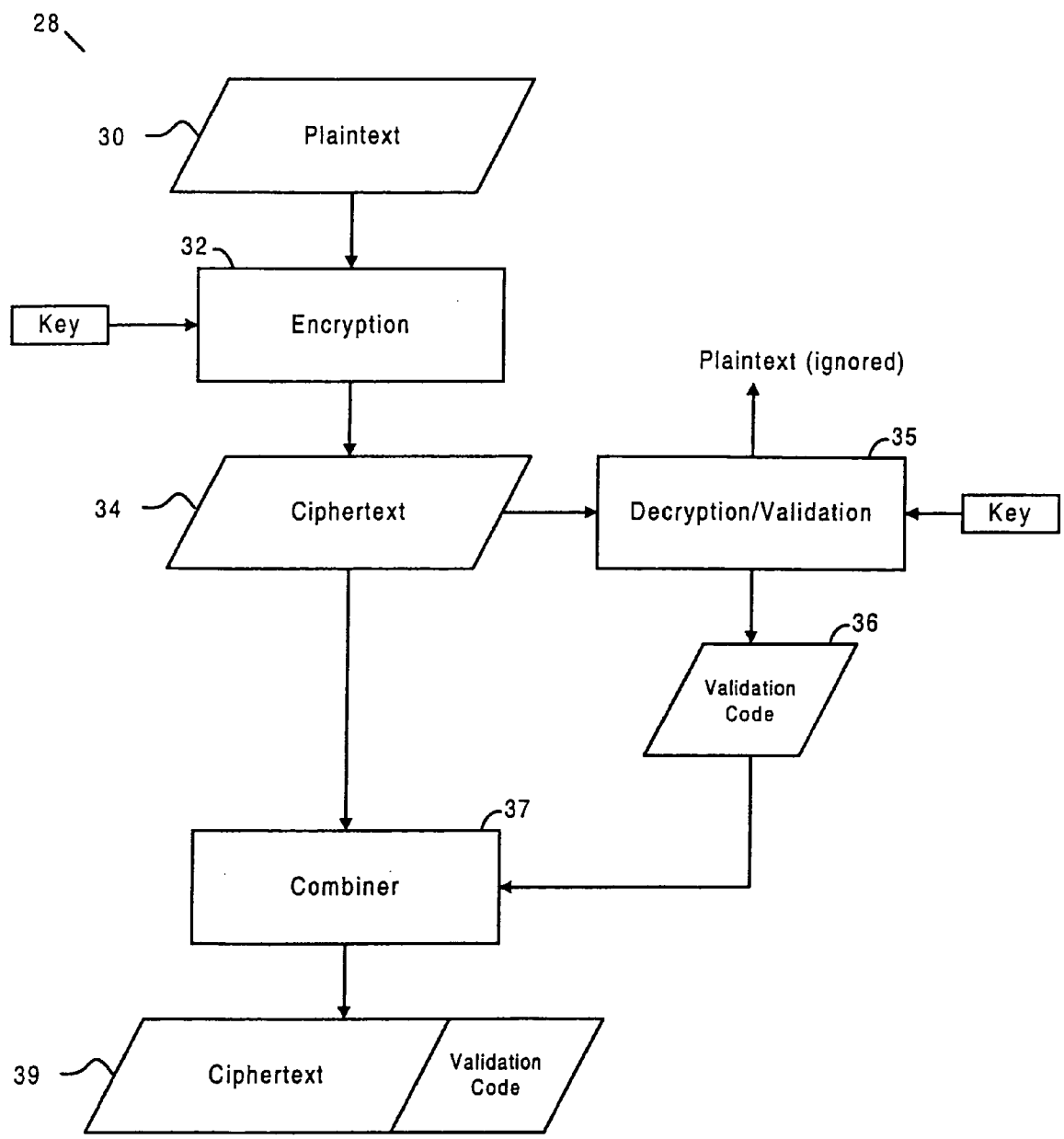
FIGS. 3A and 3B illustrate a technique for encrypting, decrypting, and validating a communication in accordance with one embodiment of the present invention.
Figure 3B:
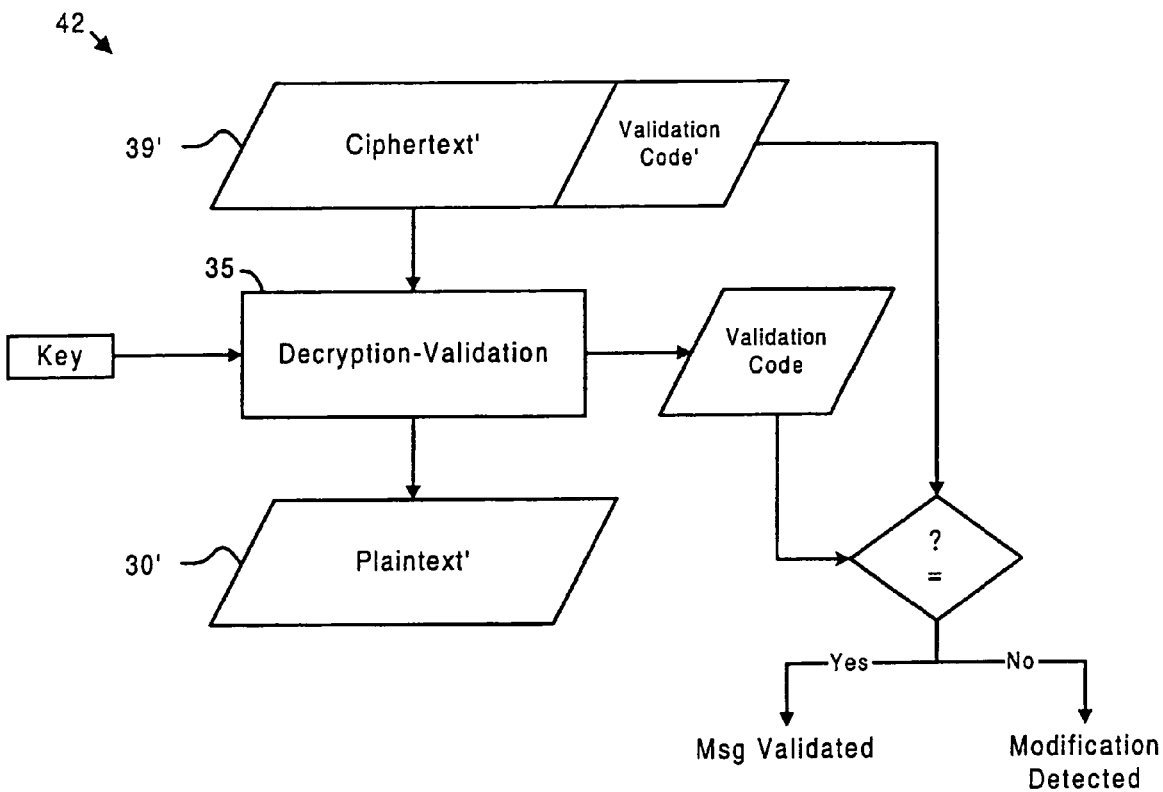

FIGS. 3A and 3B are block diagrams which illustrate a technique for encrypting, decrypting, and validating a communication in accordance with a preferred embodiment of the present invention. Referring to FIG. 3A, the sender 28 of message 30 encrypts the plaintext form of message 30 using encryption function 32 to yield ciphertext 34. Next, sender 28 generates a validation code 36 by decrypting a copy of ciphertext 34 using an integrated decryption/validation function 35 that will be described in more detail below. Sender 28 combines validation code 36 with ciphertext 34, and sends the result 39 to recipient 42. As shown in FIG. 3B, upon receipt of message 39', recipient 42 simultaneously decrypts and validates the message using integrated decryption/validation function 35. If the message is deemed to be valid by the validation process, the message is released for use by recipient 42.

Although the embodiment shown in FIGS. 3A and 3B retains the characteristic that the cost of the process performed by sender 28 is approximately double that of encryption alone, it imposes minimal additional cost on the decryption process beyond the cost of the basic decryption algorithm. In many situations, such as broadcast distribution of protected content or decryption and validation of software, the additional cost of encryption is paid only once, while the decryption process occurs many times, often in environments with limited resources. In such applications, the savings provided by the present invention are especially advantageous.

Figure 4A:
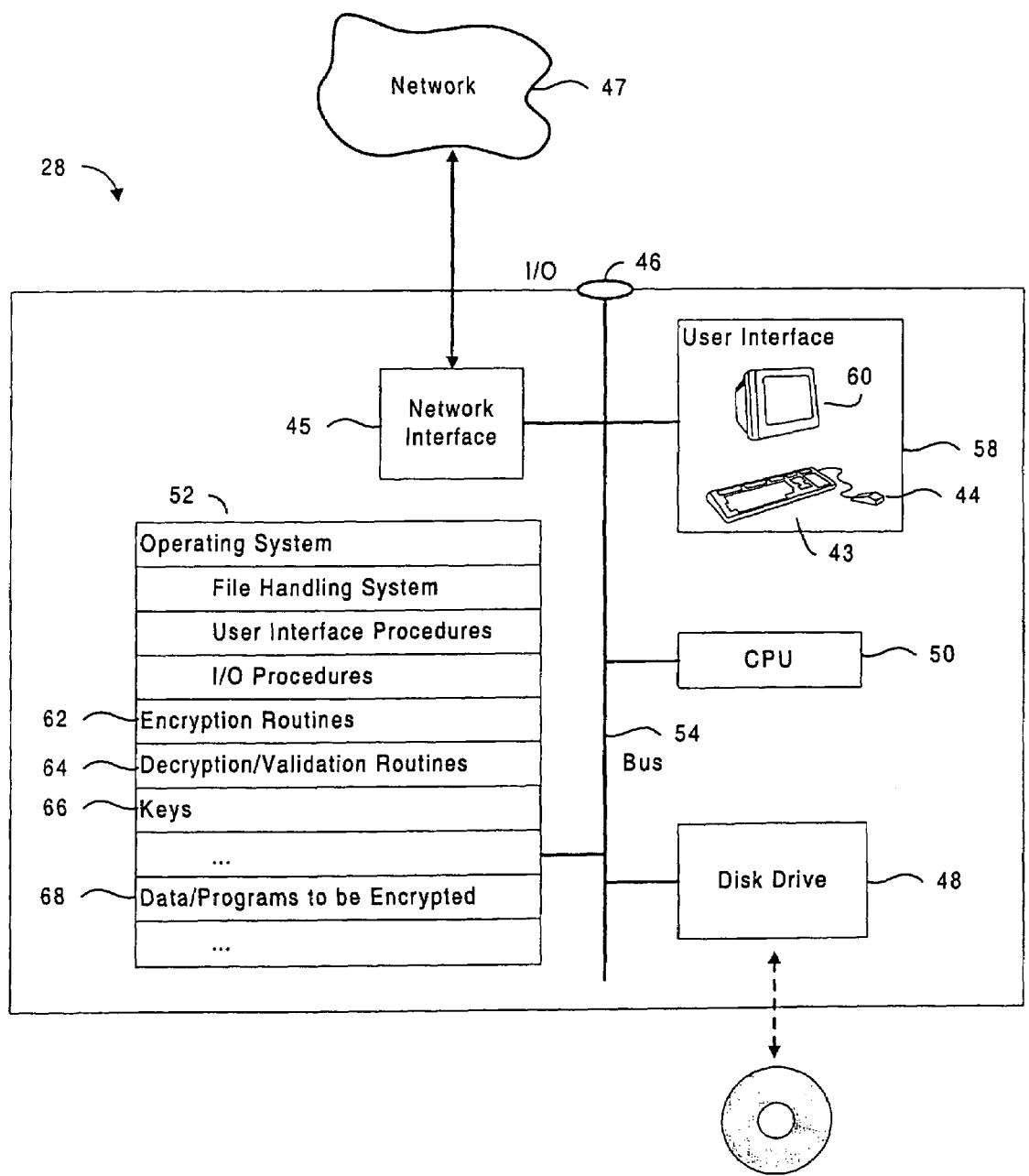
FIGS. 4A and 4B illustrate systems for practicing embodiments of the present invention.

FIG. 4A is a more detailed illustration of a system for practicing an embodiment of the present invention. As shown in FIG. 4A, the system preferably includes an encoding system 28, such as a computer, for encoding messages or data and transmitting the resulting ciphertext to a recipient's system 42, which could be another computer, a television set-top box, a portable audio or video player, or any other suitable system.

As shown in FIG. 4A, encoding system 28 preferably includes:
  a processing unit 50;
  system memory 52—preferably including both high speed random access memory (RAM) and non-volatile memory, such as read only memory (ROM), erasable or alterable non-volatile memory (e.g., flash memory), and/or a hard disk—for storing system control programs, data, cryptographic keys, encryption routines, and corresponding decryption/validation routines designed to process data in accordance with the principles of the present invention;
  one or more input/output devices, including, for example:
    network interface 45 for communicating with other systems via a network 47 such as the Internet;
    I/O port 46 for connecting to, e.g., a portable device or another computer; and
    one or more disk drives 48 for reading from, and/or writing to, diskettes, compact discs, DVDs, and/or SONY® MINIDISC™ audio discs, produced by Sony Corporation of Tokyo, Japan and New York, N.Y.;
  a user interface 58, including a display 60 and one or more input devices, such as keyboard 43 and mouse 44; and
  one or more internal buses 54 for interconnecting the aforementioned elements of the system.

The operation of system 28 is controlled primarily by programs contained in system memory 52 and executed by the system's processing unit 50. Such programs preferably include modules 62 for encrypting data and/or programs 68, and corresponding modules 64 for decrypting encrypted data and/or programs and generating a validation code for use in verifying the integrity of the encrypted data/program. One skilled in the art will understand, however, that some or all of the functionality of these modules could be readily implemented in hardware without departing from the principles of the present invention.

Figure 4B:
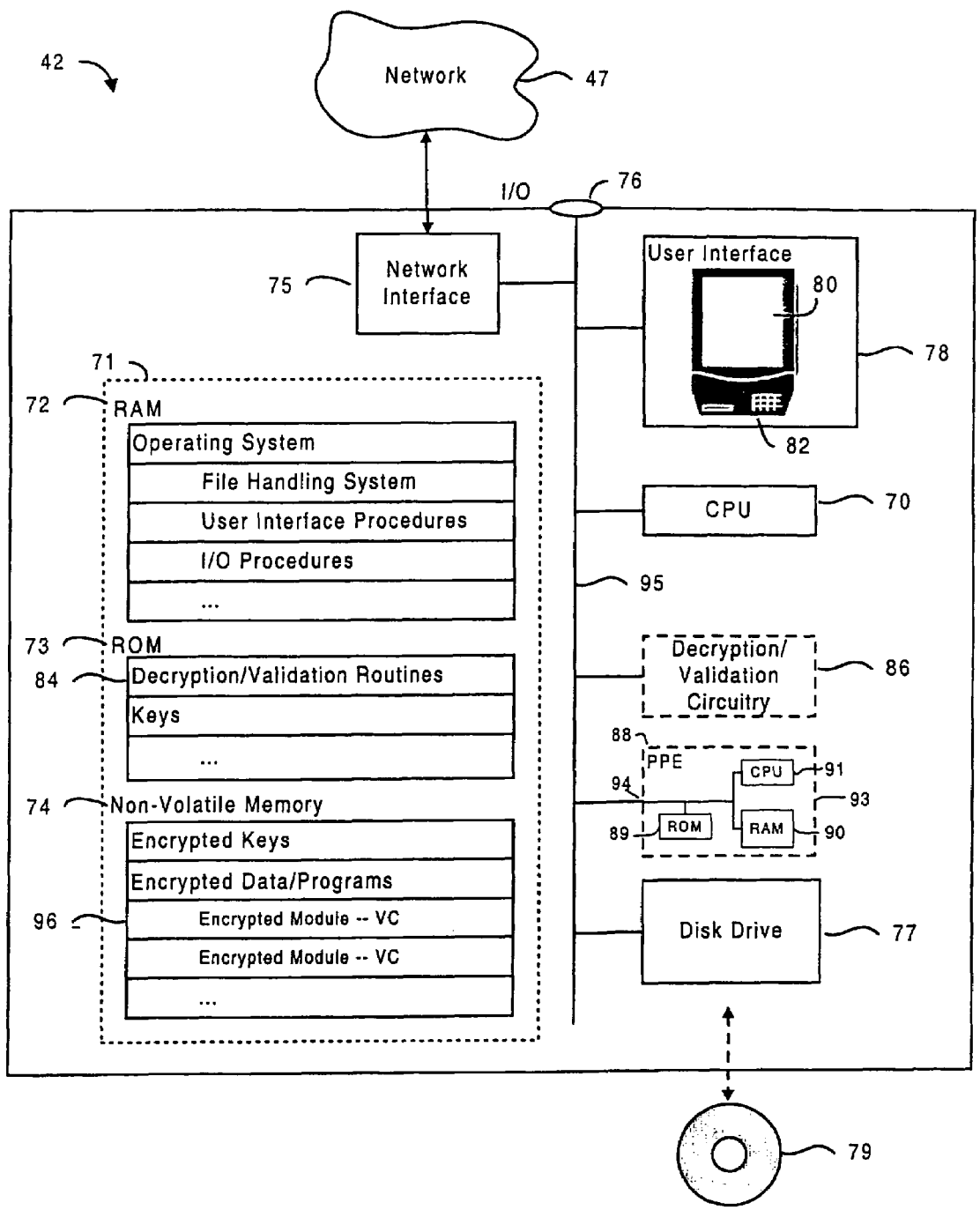

Referring now to FIG. 4B, a system 42 is shown for decoding and validating data that has been encoded by a system such as system 28. As described above, system 42 may consist of a personal computer system, a portable audio or video player, a television set-top box, telephone, personal digital assistant, or other suitable device. Recipient's system 42 is operable to decode and validate encoded data, and to release decoded data for viewing, listening, use, execution (in the case of software), and so forth. As shown in FIG. 4B, in one embodiment system 42 preferably includes:
  a processing unit 70;
  system memory 71, preferably including a combination of both RAM 72, ROM 73, and non-volatile memory 74, such as flash memory or a magnetic disk, for storing system control programs, data, and application programs;
  one or more input/output devices, including, for example:
    network interface 75 for communicating with other systems via network 47;
    I/O port 76 for connecting to, e.g., a portable device or another computer; and/or
    one or more disk drives 77 for reading data and/or programs from diskettes, compact discs, DVDs, and/or MINIDISC™ audio discs;
  a user interface 78, including a display 80 and one more user input devices, such as control panel 82; and
  one or more internal buses 95 for interconnecting the aforementioned elements of the system.

System 42 also includes decoding/validating logic 84 for decoding and validating data, such as encrypted module 96, that has been encoded using the techniques set forth herein. Encrypted data can be delivered to system 42 in a variety of ways, including via network interface 75, I/O port 76, a disc or diskette inserted into drive 77, or by physically installing, e.g., a flash memory chip (such as memory 74) containing encrypted data/programs in system 42. In one embodiment, system 42 is also able to encrypt data in the manner described above in connection with FIGS. 3A and 4A.

As described in more detail below, in one embodiment decoding logic is used at system start-up to decrypt and validate system control programs (e.g., firmware) stored in non-volatile memory 74 (e.g., flash memory) and/or discs 79, the programs being operable, when decrypted and validated, to initialize and control the operation of system 42. In one embodiment, decoding logic 84 is implemented in firmware stored in ROM 73 and executed by processor 70; however, one skilled in the art will appreciate that the decoding logic could alternatively be implemented using optional cryptographic circuitry 86, programs stored in RAM 72, or any other suitable combination of firmware, circuitry, and/or other programs.

In yet another embodiment, decoding logic is implemented within a special, protected processing environment 88, such as that provided by a self-contained chip. As shown in FIG. 4B, such a protected processing environment (PPE) 88 preferably includes non-volatile memory 89, volatile memory 90, processor 91, a tamper-resistant barrier 93, and a communications port 94 for communicating with other components of system 42. Use of a protected processing environment can be advantageous, in that it provides an area that is protected from unauthorized observation or modification in which to store cryptographic keys and to perform cryptographic operations. Additional information on suitable implementations of a protected processing environment can be found in Ginter, et. al "Systems and Methods for Secure Transaction Management and Electronic Rights Protection," U.S. Pat. No. 5,892,900, issued on Apr. 6, 1999 ("the '900 patent"), which is hereby incorporated by reference. It should be understood, however, that the present invention can be readily implemented using systems and methods that do not include a special, protected processing environment.

The operation of system 42 will now be further described with reference to an illustrative application of the invention; one of ordinary skill in the art will appreciate, however, that there are many other applications for the systems and methods described herein. In this illustrative embodiment, decryption/validation logic 84 is contained in ROM 89 of protected processing environment 88. Using decryption/validation logic 84, system 42 decrypts and validates firmware modules 96 stored in non-volatile (e.g., flash) memory 74. When decrypted and validated, firmware modules 96' are operable to, e.g., execute system control functions, execute system security functions, and/or provide data for system security functions.

Referring to FIG. 4B, at system startup, ROM 89 obtains an encrypted module and its validation code (VC) via port 94. Working in conjunction with RAM 90 and processor 91, decryption/validation firmware stored in ROM 89 decrypts the encrypted modules and checks their validity using each module's associated validation code. If the module is valid, it is loaded into RAM 90 (or retained in RAM, if it was already loaded), where it is used to control the operation of system 42 in a secure manner. In order to perform the decryption/validation operation, it may be necessary to load the appropriate decryption key into RAM 90, and, if the key is encrypted, to decrypt it using another key stored in ROM 89.

Different key management schemes may provide that firmware modules 96 are encrypted such that they are usable on all instances of PPE 88, on only a single instance of PPE 88, or on a subset of instances of PPE 88. In addition, each firmware module 96 need not be encrypted in the same manner as the other firmware modules contained in the system (e.g., some may be encrypted using keys common to all instances, while others are encrypted with keys common to a single instance). Encrypted firmware modules 96 may be supplied to a system 42 containing PPE 88 by an external secure server that performs the encryption (and calculates the validation code). Such a server may create the encrypted modules 96 dynamically upon request from system 42, the server performing the appropriate cryptography based on a request identifying the particular instance of PPE 88 that will use the modules 96. The encrypted firmware modules 96 that are supplied by the server can be copied into non-volatile memory 74. Encrypted firmware modules 96 may also be distributed by other means (e.g., on disk or CD-ROM), and copied into non-volatile memory 74. Encryption keys used in preparing encrypted firmware modules 96 may be held in a table by a secure server, may be derived cryptographically from the request and/or identification information in the request, and/or may be generated or maintained by other means appropriate to a particular key management regime.

Figure 5:
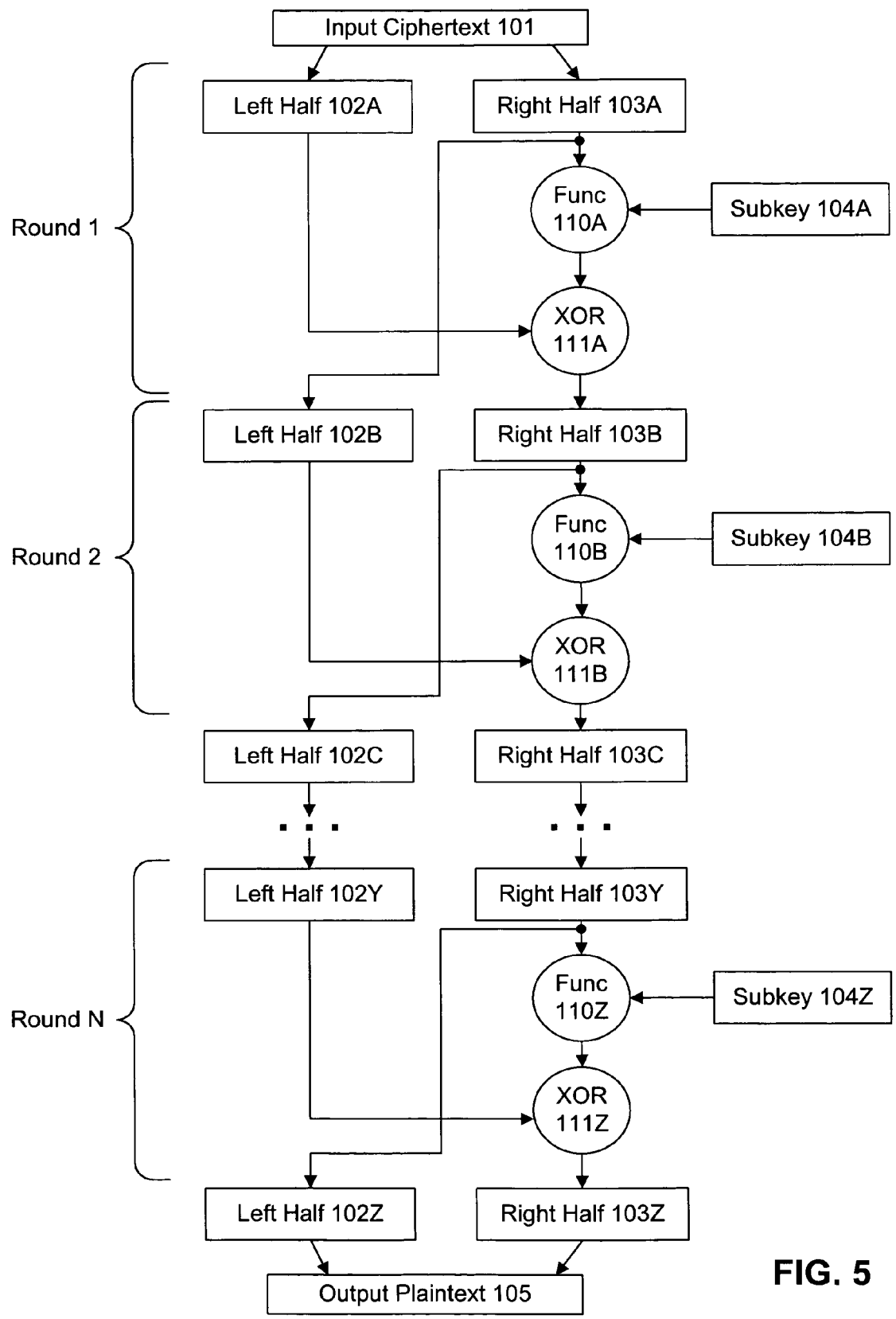
FIG. 5 illustrates a basic Feistel network.

The structure and operation of the encoding and decoding logic will now be described in more detail with reference to FIGS. 5 through 13. Referring to FIG. 5, a conventional Feistel network decryption structure is shown. Input ciphertext 101 is split into two halves, left half 102a and right half 103a. In the first "round" of processing, right half 103a is input to mixing function 110a, and also becomes left half 102b in the subsequent round. The output of function 110a is combined with left half 102a using exclusive-OR (XOR) function 111a, the output of which becomes right half 103b for the subsequent round. A similar process is performed in the second round: mixing function 110b processes right half 103b, its output is combined by XOR 111b with left half 102b, with the result becoming right half 103c, and with right half 103b becoming left half 102c. This process is repeated for a specified number of rounds, finally yielding final left half 102z and right half 103z, which, combined, are treated as plaintext block 105. In each round, the definition of mixing functions 110 does not change, or changes in a well-defined manner, so that the same basic function can be used in many iterations. However, subkeys 104a through 104z are also input to corresponding mixing functions 110a through 110z, to ensure that it provides varying output. The corresponding encryption process simply reverses the order of the subkeys and exchanges ciphertext 101 and plaintext block 105. Many conventional ciphers are based on this basic structure, including DES, CAST, and the Tiny Encryption Algorithm (TEA). Additional information on Feistel networks, block cipher algorithms, and other aspects of cryptography can be found in H. Feistel, *Cryptography and Computer Privacy*, Scientific American, v. 228, n. 5, May 1973, pages 15–23; B. Schneier, *Applied Cryptography*, 2d ed., chapters 9–18 (Wiley, 1996); and J. Daemen and V. Rijmen, *AES Proposal: Rijndael*, version 2 (1999), which are hereby incorporated by reference.

Figure 6:
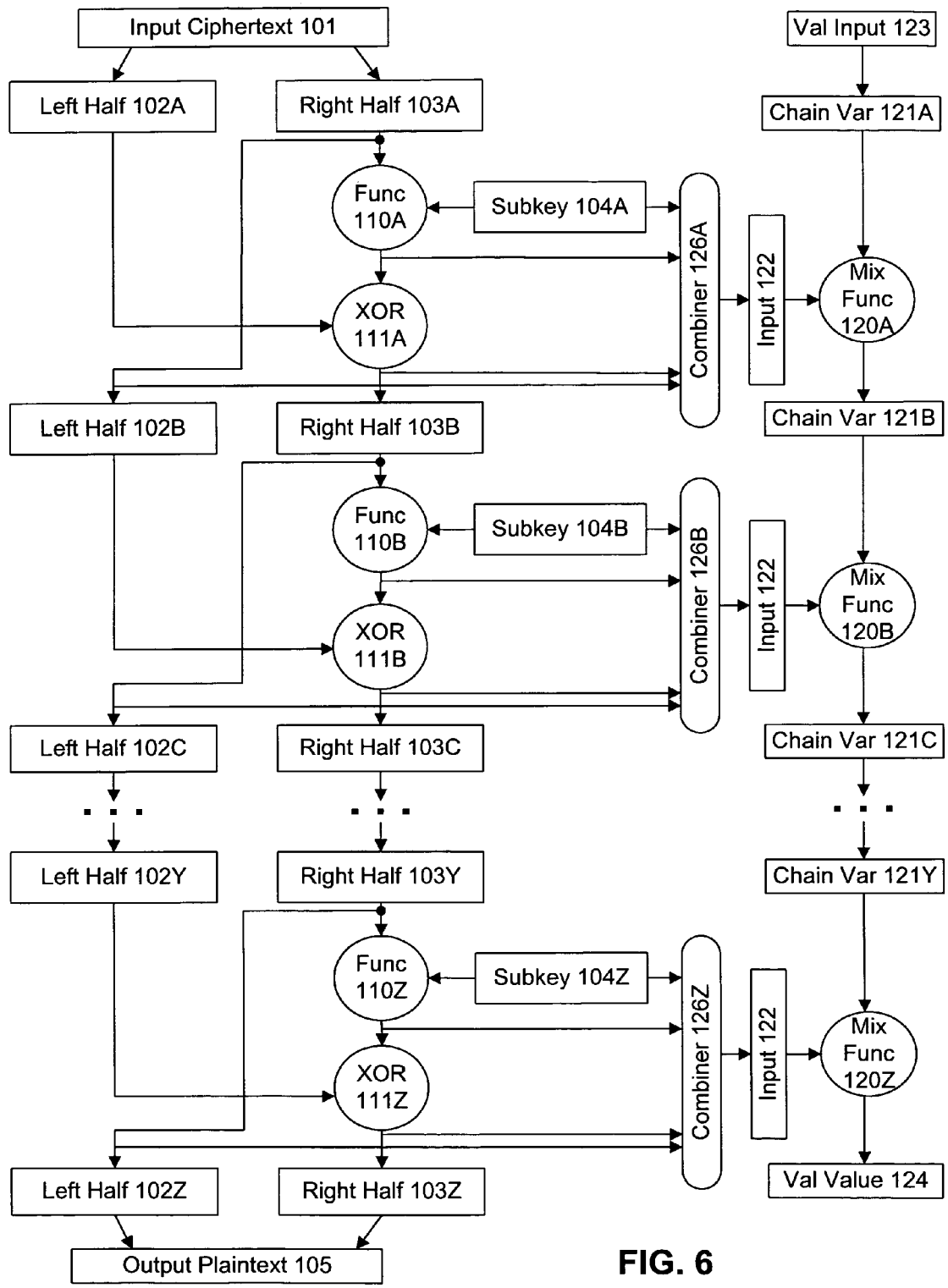
FIG. 6 illustrates a Feistel network modified in accordance with the principles of the present invention.

As shown in FIG. 6, the present invention modifies the structure shown in FIG. 5. With reference to FIG. 6, internal values such as the output of mixing functions 110, left or right halves 102 or 103, and/or subkeys 104 are extracted from the decryption process and fed into additional mixing function 120. In each round where it is used, mixing function 120 combines chaining variable 121 with input 122, which is selected from the possible input values by combiner (e.g., a concatenation or other function) 126. The output of final mixing function 120z becomes validation value 124.

Mixing function 120 may be executed once for every round of the block cipher, or only for selected rounds during its operation, based on a pattern that can be predefined, key-dependent, input-dependent, or any combination thereof. Similarly, the selection of mixing input value 122 may be identical for each round, or may vary in accordance with a pattern that can be predefined, key-dependent, input-dependent, or any combination thereof. Also, mixing function 120 may be the same function each time, or may itself vary in a pattern that is predefined, key-dependent, input-dependent, or any combination thereof. However, in a preferred embodiment, mixing function 120 is chosen such that it is not invertible, as an attack on it could otherwise yield information relevant to the internal operation of the cipher.

Figure 7:
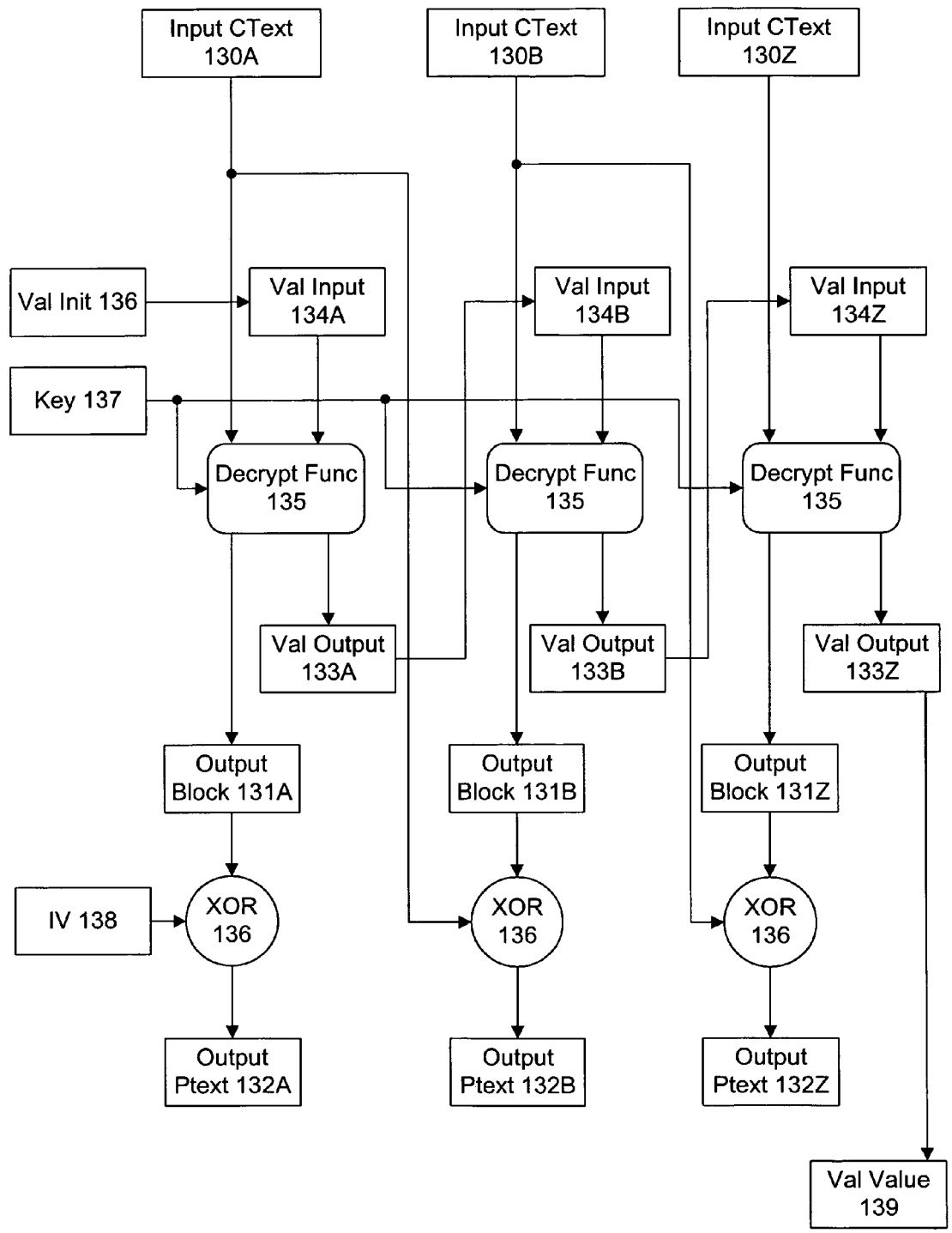
FIG. 7 illustrates cipher block chaining with validation.

If input chaining value 123 is zero or some other well-defined constant, the function shown in FIG. 6 provides validation for a single ciphertext block. However, as shown in FIG. 7, the same process can be extended to other modes of operation, such as cipher block chaining (CBC) mode. In this mode, each input ciphertext block 130 is decrypted by decryption function 135, which produces two outputs: output block 131 and validation output 133, based on key 137. Initial validation input value 134a is derived from (e.g., is equal to, or a constant function of) validation initializer 136. In CBC mode, output block 131 is combined with previous ciphertext block 130, using XOR function 136, to produce plaintext block 132. As is conventionally defined for CBC mode, first output block 131a is combined with initialization vector 138 to yield output plaintext block 132a. In addition, validation output 133 becomes validation input 134 for the decryption function for the next plaintext block, and final validation output 133z becomes the validation value 139 for the entire decrypted plaintext. One of ordinary skill in the art will understand that similar techniques can be used to integrate such validation processing with other cryptographic modes, such as electronic codebook (ECB) mode and cipher feedback (CFB) mode.

Figure 8:
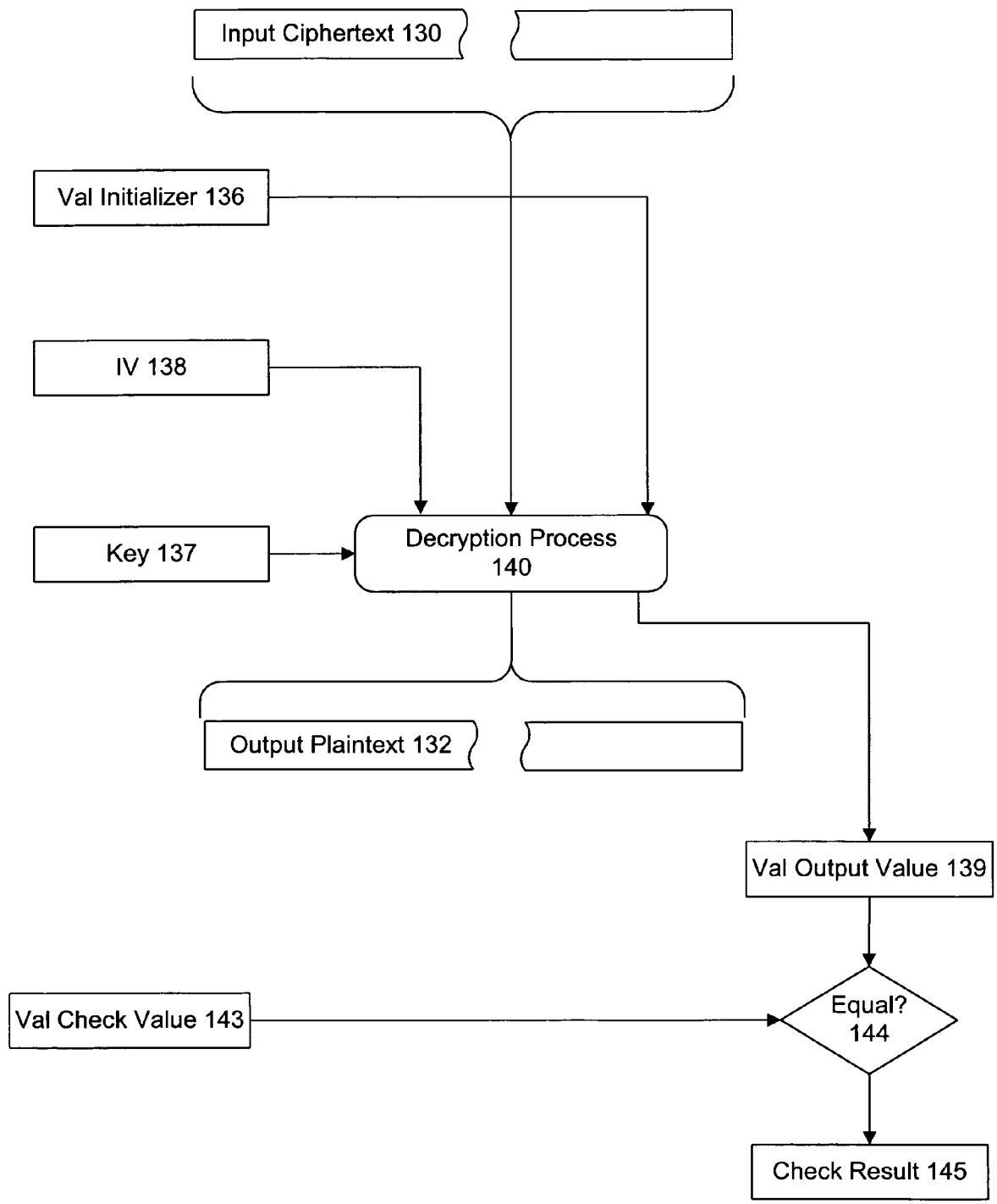
FIG. 8 illustrates a combined decryption and validation process.

As shown in FIG. 8, decryption process 140 produces a final validation value 139 that can be compared with a separately stored validation check value 143 to validate the integrity of decrypted data 142, using equality function 144, to produce check result 145. Check result 145 indicates whether input ciphertext 130, or validation check value 143, has been modified before being decrypted.

Within the bounds of the cryptographic strength of decryption process 140, and the size of key 137, only a person who knows secret key 137 (and also validation initializer 136 and initialization vector 138, although those are conventionally considered known public values, not secrets) can produce a modified version of input ciphertext 130 with a validation output value 139 that matches validation check value 143.

To produce a validation value 143 associated with encrypted data 141, the encryption process may include a pass through decryption process 140 to produce validation value 143. This additional step is used if combiner 126, and/or mixing function 120, is irreversible (e.g., if calculating the function destroys information about its inputs). Because the encryption and decryption processes of a Feistel network are symmetric, it is also possible to employ a reversible mixing function that can be calculated during the encryption process and will yield the same result. Such a function is described in more detail below with reference to FIG. 11.

If an irreversible mixing function is used, this additional step can effectively double the runtime cost of the encryption process. However, this step employs the same algorithm, uses the same key, and can be performed one block at a time (i.e., the output of each block's encryption can be immediately processed by the decryption function). During this process, the decryption function's decrypted output is ignored, but the validation values are processed as normal, so that the final such output can be associated with the encrypted data. Use of an irreversible mixing function is desirable from a cryptographic standpoint, but introduces a cost which may (or may not) be a disadvantage depending on the architecture of the system in which the overall process is employed.

Figure 9:
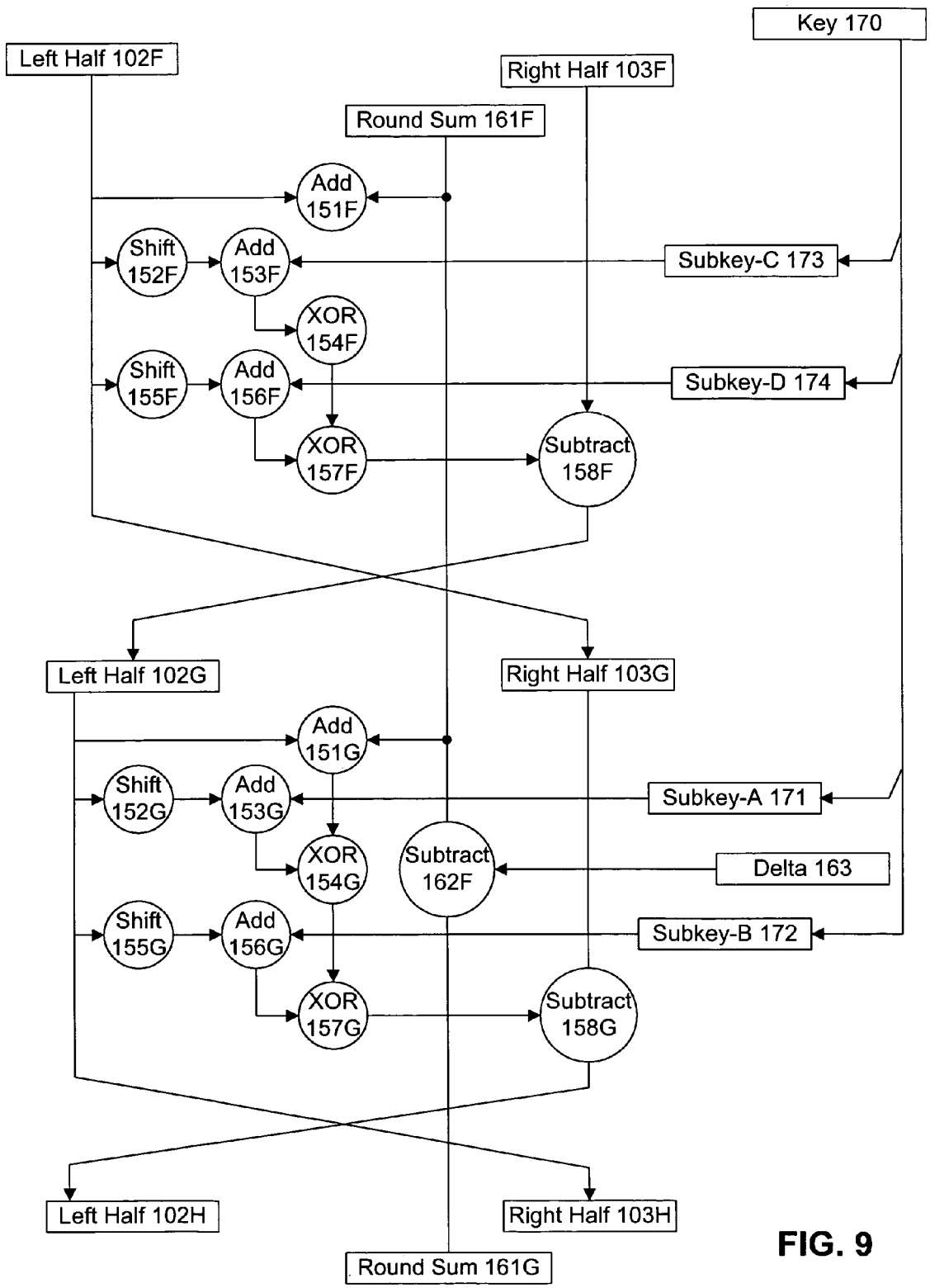
FIG. 9 illustrates an embodiment of the Tiny Encryption Algorithm.

FIG. 9 shows two rounds of the Tiny Encryption Algorithm (TEA). The TEA algorithm is described here to provide a detailed example of how validation can be integrated with a conventional cipher construction. TEA is a block cipher with a 64-bit block size and a 128-bit key 170. Although there are 64 rounds, TEA is fast because each round is very simple. Operations in the TEA algorithm are performed on 32-bit words. Addition and subtraction are performed unsigned, without overflow. Additional information on the TEA algorithm can be found in D. R. Wheeler and R. Needham, *TEA, A Tiny Encryption Algorithm*, Technical Report 355, "Two Cryptographic Notes," Computer Laboratory, pp. 1–3 (Cambridge, December 1994), which is hereby incorporated by reference.

As shown in FIG. 9, key 170 is divided into four 32-bit components, subkey-A 171, subkey-B 172, subkey-C 173, and subkey-D 174, which are created by selecting the first, second, third, and last 32-bit substrings of key 170. Key 170, and subkeys 171–174, are the same for all rounds of the cipher. Subkeys 171–174 are used in pairs in alternate rounds, such that all four subkeys are used in each pair of rounds.

Round sum 161 is a known 32-bit value that is changed with every two rounds. Before the first round, it is initialized to a constant value (C6EF3720 hexadecimal), and after every two rounds, it is decreased by another constant 32-bit value, delta value 163 (9E3779B9 hexadecimal). The purpose of round sum 161 is to provide a changing input to other functions in the cipher.

As in a Feistel cipher (e.g., FIG. 5), the input ciphertext block is broken into a left half 102 and a right half 103. FIG. 9 shows an intermediate state in a Feistel network, starting with left half 102f and right half 103f, and yielding (after two rounds), left half 102h and right half 103h. In the first round, left half 102f is: (a) combined with round sum 161f by add function 151f, (b) shifted left four bits by shifter 152f and combined with subkey-C 173 using add function 153f, and (c) shifted right five bits by shifter 155f and combined with subkey-D 174 using add function 156f. Left half 102f also becomes right half 103g for the next round. The results of add functions 151f and 153f are combined by XOR function 154f, the result of which is combined with the result of add function 156f by XOR function 157f. The result of XOR function 157f is then subtracted from right half 103f using subtract function 158f to yield left half 102g for the next round. The second round is identical to the first round except that subkey-A 171 and subkey-B 172 are used in place of subkey-C 173 and subkey-D 174, and round sum 161 is decreased (after use in the second round) by delta value 163 using subtract function 162f.

In C-language source code, the pair of round functions shown in FIG. 9 can be expressed as follows:

```
right_half = right_half
    - (   ((left_half << 4) + subkey_c)
        ^ (left_half + round_sum)
        ^ ((left_half >> 5) + subkey_d));
left_half = left_half
    - (   ((right_half << 4) + subkey_a)
        ^ (right_half + round_sum)
        ^ ((right_half >> 5) + subkey_b));
round_sum = round_sum - delta;
```

Figure 10:
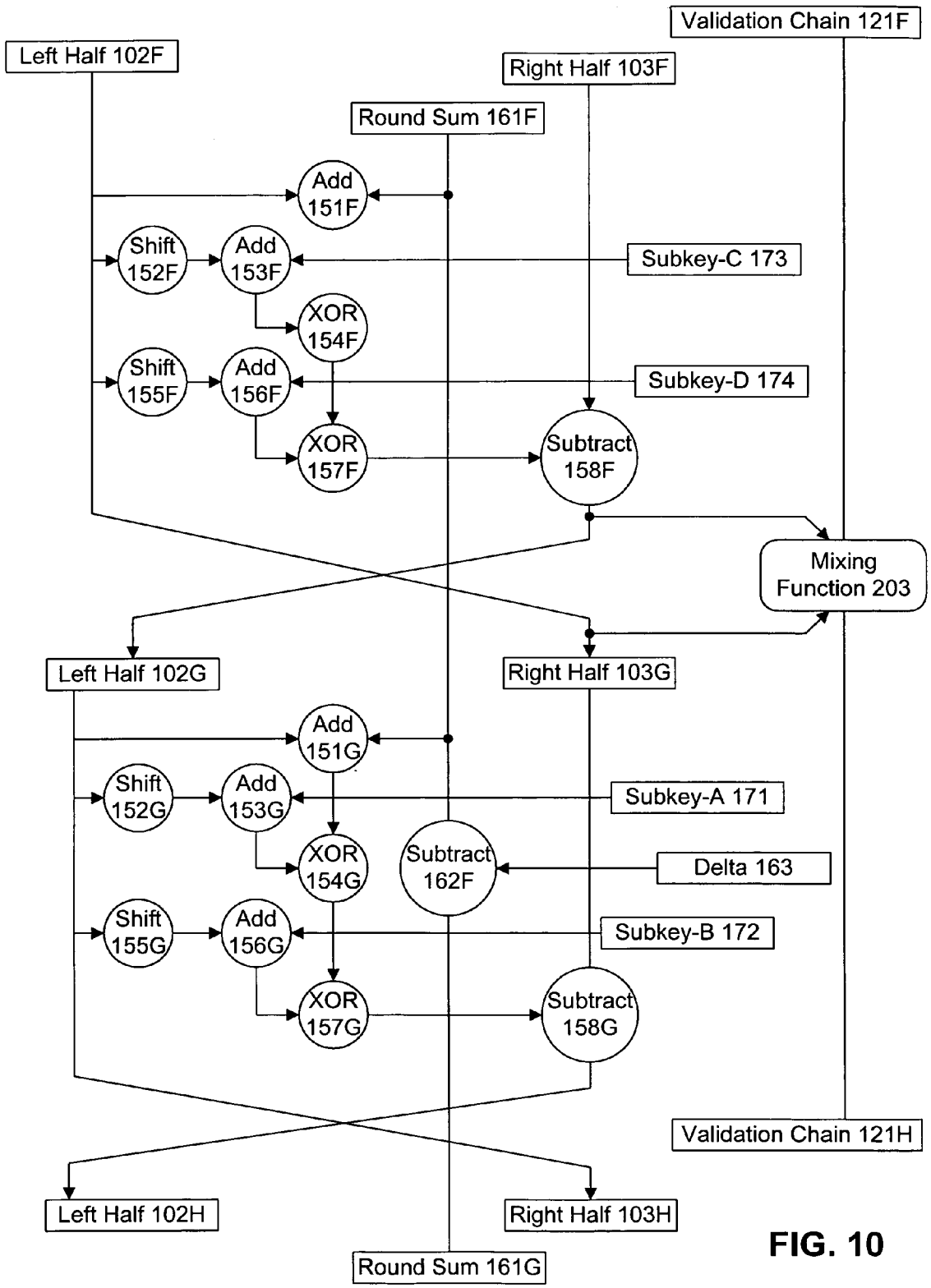
FIG. 10 illustrates the Tiny Encryption Algorithm with validation.

FIG. 10 shows an enhancement to the TEA algorithm designed to collect the internal state (consisting of intermediate left half 102g and right half 103g) after every alternate round, and to deliver it to mixing function 203. Mixing function 203 is provided with an input validation chain value 121f and produces an output chain value 121h. As shown in FIG. 6, an entire run of the cipher (all 64 rounds in the case of TEA) starts with input ciphertext block 101 and validation input 123, and produces output plaintext block 105 and validation output 124.

The construction shown in FIG. 10 uses the state between alternate rounds such that the inputs of mixing function 203 are not directly visible as inputs or outputs to the overall cipher algorithm (e.g., as part of input ciphertext block 101 or output plaintext block 105). Other embodiments could utilize a mixing function 203 that is invoked after every round, and/or that takes as inputs other aspects of the cipher's internal state, such as the outputs or inputs of any of the functions 151–159 used in computing the round.

One of ordinary skill in the art will appreciate that the structure and functionality shown in FIGS. 5–10 (and FIGS. 11–13) readily lends itself to implementation in hardware, software, or some combination thereof. For example, standard circuit components such as adders, XOR gates, subtractors, comparators, shift registers, and so forth could be used to create a circuit implementation of the structure shown in FIGS. 5–13. Moreover, the same or equivalent functionality is provided by most programming languages and processor architectures, thus making a software implementation of all or part of FIGS. 5–13 similarly straightforward.

Figure 11:
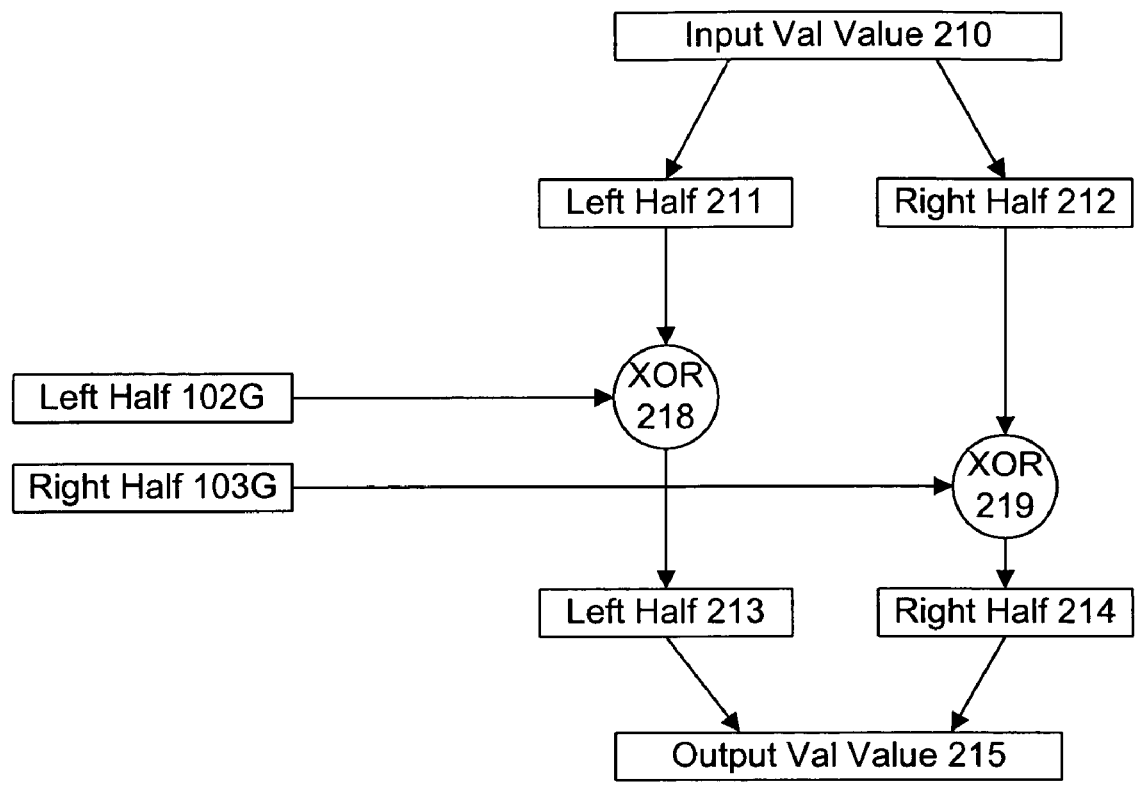
FIG. 11 illustrates a simple validation function for the Tiny Encryption Algorithm with validation.

FIG. 11 shows an example of a function that can be used as mixing function 203. Here, 64-bit input validation value 210 is divided into two 32-bit parts, input validation left half 211 and input validation right half 212. Each half is combined, using, e.g., XOR functions, with internal round-state left half 102g and right half 103g respectively. The resulting validation output left and right halves 213 and 214 are combined to produce output validation value 215. Because the internal functions 218 and 219 shown in FIG. 11 are reversible, this example mixing function is reversible and can be used during encryption as well.

Figure 12:
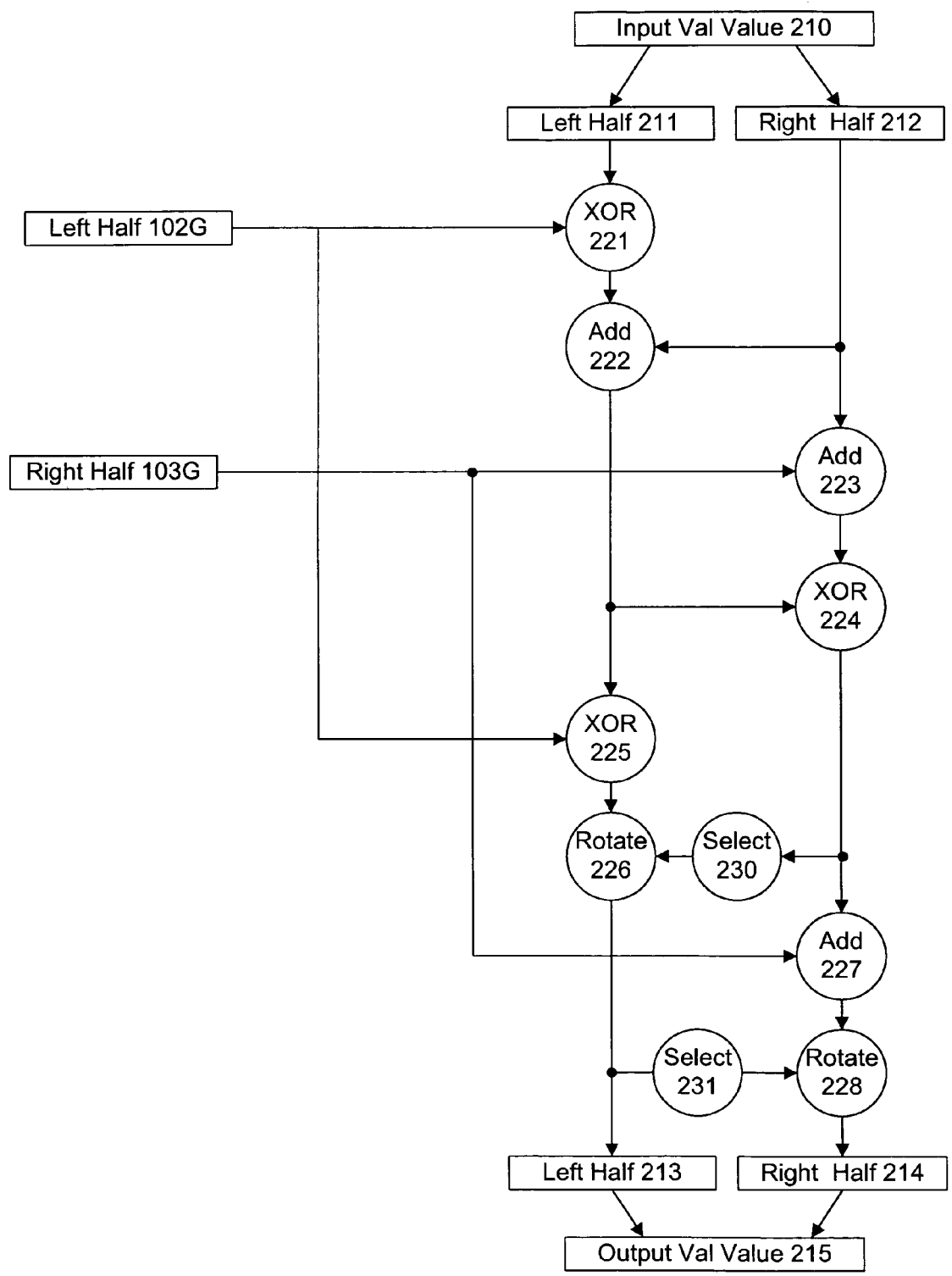
FIG. 12 illustrates a more complex validation function for the Tiny Encryption Algorithm with validation.

FIG. 12 shows another example of a function that can be used as mixing function 203. Here, 64-bit input validation chain value 210 is divided into two 32-bit parts, input validation left half 211 and input validation right half 212. Left half 211 is first combined, using XOR function 221, with internal round-state left half 102g. The result is then combined with right half 212 using add function 222. Right half 212 is combined with right half 103g using add function 223. The result of add function 223 is then combined with the output of add function 222 using XOR function 224. The output of add function 222 is also combined with internal round-state left half 102g using XOR 225. The result is then rotated left by the number of bits specified by bits 11–15 of the output of XOR 224, as extracted by select function 230. The output of XOR 224 is also combined, via add function 227, with internal round-state right half 103g. The result is then rotated left by the number of bits specified by bits 19–23 of the output from rotate function 226, as selected by select function 231. The outputs of rotate functions 226 and 228 become validation output left and right halves 213 and 214, respectively, which are combined to yield output validation chain value 215. The example function shown in FIG. 12 is chosen to make efficient use of readily available operations in a typical 32-bit microprocessor. It will be understood by one skilled in the art that other operations, combinations, or orders could also be used to yield appropriate mixing functions.

Figure 13:
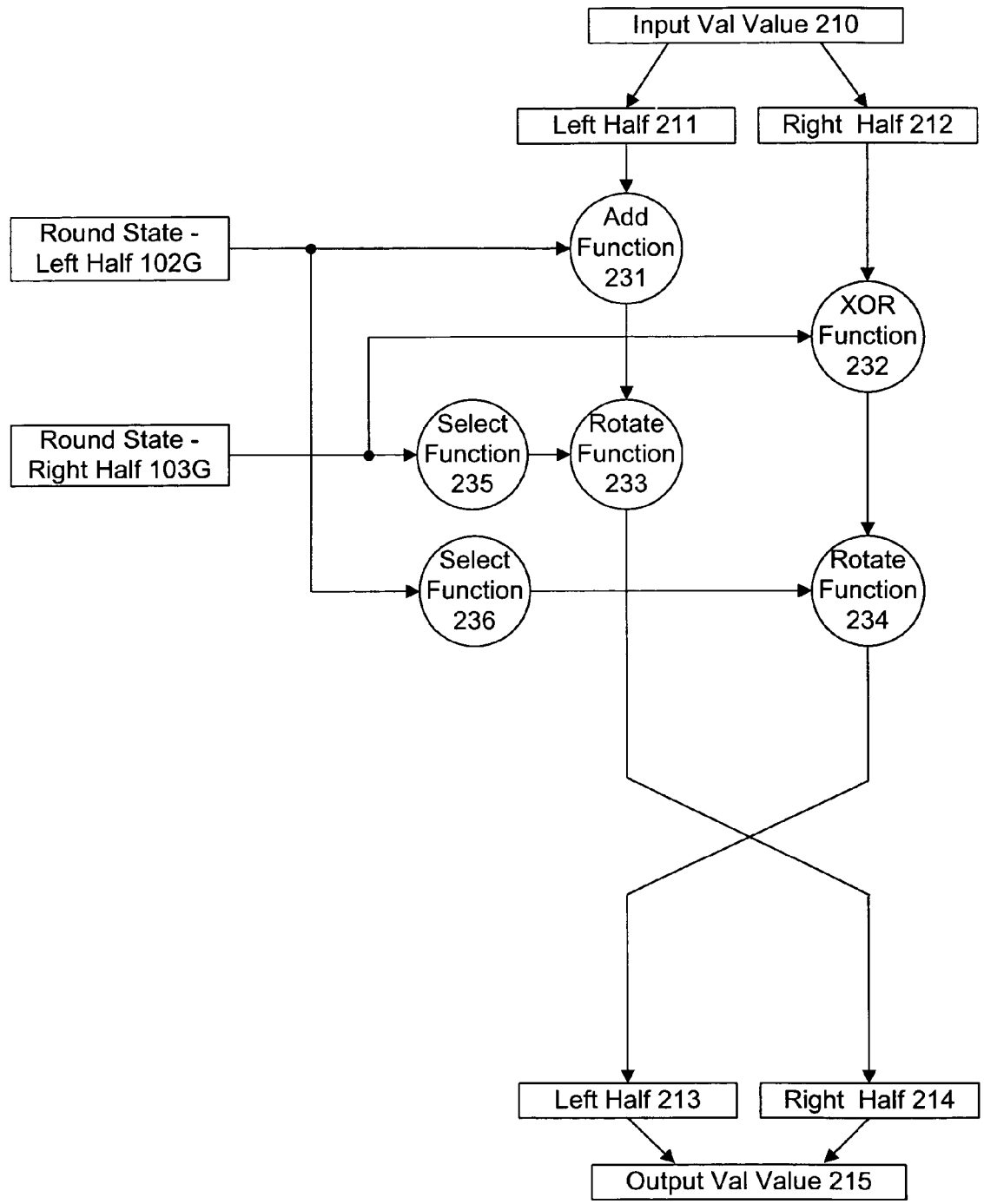
FIG. 13 illustrates an intermediate-complexity validation function for the Tiny Encryption Algorithm with validation.

FIG. 13 shows a third example of a function that can be used as mixing function 203. Here, 64-bit input validation chain value 210 is divided into two 32-bit parts, input validation left half 211 and input validation right half 212. Validation left half 211 is combined, using 32-bit unsigned add function 231, with internal round-state left half 102g. The output of function 231 is rotated right, using rotate function 233, by the number of bits specified by the lowest order five bits of internal round-state right half 103g, the bits being selected by selection function 235. Validation right half 212 is combined, using XOR 232, with internal round-state right half 103g. The output of function 232 is rotated right, using rotate function 234, by the number of bits specified by the five lowest order bits of internal round-state left half 102g, the bits being selected by selection function 236. The output of function 233 (which was derived from input left half 211) becomes output validation right half 214, and the output of function 234 (which was derived from input right half 212) becomes output validation left half 213. Output left half 213 and right half 214 are combined to yield output validation chain value 215. The validation function of FIG. 13 represents an intermediate level of complexity.

The examples of mixing function 203 shown in FIGS. 11, 12, and 13 are three possible cases of such functions. A practitioner skilled in the art can define other functions with similar characteristics, depending on the needs of the application. In particular, it is possible to use a conventional secure hash function (e.g., SHA-1) as the mixing function, providing considerable added security, although at a cost similar to using the hash function independently of the basic encryption function.

Integration of the present invention into ciphers such as DES, RC5, RC6, or CAST, which follow the basic Feistel construction, is also straightforward, and can, if desired, employ the same mixing function and round selection as with TEA. It will be appreciated that other mixing functions, round selections, or input values may also be chosen.

The present invention can also be readily integrated into ciphers that do not follow the Feistel construction, such as Rijndael. Generally, all that is needed is access to the internal state of the cipher during its multiple rounds, and delivery of that state to an appropriate mixing function. In the specific example of the Rijndael function, the cipher's internal state is carried in a rectangular matrix of byte values. To implement the validation mechanism of the present invention, bytes can be selected from that matrix and combined using an appropriate mixing function. For example, such selection and mixing functions could be similar or identical to the examples shown in FIGS. 11, 12, and 13, or could be any other suitable combination of selection and mixing functions.

Thus, while the foregoing invention has been described in some detail for purposes of clarity of understanding, it will be apparent that certain changes and modifications may be practiced within the scope of the appended claims, and that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method for performing a mixing operation for use in authenticating encrypted data, the method comprising the steps of:
   receiving an input data block;
   dividing the input data block into a first segment and a second segment;
   using a first function to combine the first segment with a first input;
   using a second function to combine the second segment with a second input;
   generating a first output by performing a first transformation on an output of the first function, wherein the first transformation is based, at least in part, on the second input;
   generating a second output by performing a second transformation on an output of the second function, wherein the second transformation is based, at least in part, on the first input;
   combining the first output and the second output to form an output data block.

2. The method of claim 1, wherein the first transformation comprises a bit-wise rotation of the output of the first function by a number of bits specified by a predefined portion of the second input, and wherein the second transformation comprises a bit-wise rotation of the output of the second function by a number of bits specified by a predefined portion of the first input.

3. The method of 2, wherein the predefined portion of the first input comprises the five lowest order bits of the first input, and wherein the predefined portion of the second input comprises the five lowest order bits of the second input.

4. The method of claim 1, in which the first function comprises an unsigned add function, and in which the second function comprises a logical exclusive-or function.

5. The method of claim 1, in which the first input comprises a first internal round state of a block cipher, and in which the second input comprises a second internal round state of the block cipher.

6. The method of claim 5, in which the block cipher is an implementation of the Tiny Encryption Algorithm.

7. A system for performing a mixing operation for use in authenticating an encrypted file, the system including:
   first logic for partitioning an input data block into a first segment and a second segment;
   an adder for adding the first segment to a first input;
   an exclusive-or calculator for combining the second segment with a second input;
   second logic for rotating an output of the adder by a number of bits specified by a predefined portion of the second input;
   third logic for rotating an output of the exclusive-or calculator by a number of bits specified by a predefined portion of the first input;
   fourth logic for combining an output of the second logic and an output of the third logic to form an output data block.

8. The system of claim 7, wherein at least one of the adder, the exclusive-or calculator, the first logic, the second logic, the third logic, and the fourth logic are implemented in software, the system further including a processor for executing the software.

9. The system of claim 7, wherein the predefined portion of the first input comprises lowest order bits of the first input, and wherein the predefined portion of the second input comprises lowest order bits of the second input.

10. The system of claim 7, wherein the predefined portion of the first input comprises about five lowest order bits of the first input, and wherein the predefined portion of the second input comprises about five lowest order bits of the second input.

11. The system of claim 7, in which the first input and the second input are comprised of internal round state data of a block cipher.

12. A system as in claim 11, in which the first input comprises a first internal round state of the block cipher, and in which the second input comprises a second internal round state of the block cipher.

13. A method for performing a mixing operation for use in authenticating encrypted data, the method comprising the steps of:
   receiving an input data block;
   dividing the input data block into a first segment and a second segment;
   using a first function to combine the first segment with a first input;
   using a second function to combine the second segment with a second input;
   generating a first output by performing a first transformation including a bit-wise rotation on an output of the first function, wherein the first transformation is based, at least in part, on the second input;
   generating a second output by performing a second transformation on an output of the second function; and
   combining the first output and the second output to form an output data block.

14. The method of claim 13, wherein the bit-wise rotation of the output of the first function is executed as a function of a number of bits specified by a predefined portion of the second input, and wherein the second transformation comprises a bit-wise rotation of the output of the second function by a number of bits specified by a predefined portion of the first input.

15. The method of claim 14, wherein the predefined portion of the first input comprises lowest order bits of the first input, and wherein the predefined portion of the second input comprises lowest order bits of the second input.

16. The method of claim 14, wherein the predefined portion of the first input comprises about five lowest order bits of the first input, and wherein the predefined portion of the second input comprises about five lowest order bits of the second input.

17. The method of claim 13, in which the first function comprises an unsigned add function, and in which the second function comprises a logical exclusive-or function.

18. The method of claim 13, wherein the first input and the second input are comprised of internal round state data of a block cipher.

19. The method of claim 13, wherein the first input comprises a first internal round state of a block cipher, and in which the second input comprises a second internal round state of the block cipher.

20. The method of claim 19, wherein the block cipher is an implementation of the Tiny Encryption Algorithm.

21. A system for performing a mixing operation for use in authenticating an encrypted file, the system including:
   first logic for partitioning an input data block into a first segment and a second segment;
   an adder for adding the first segment to a first input;
   a calculator for combining the second segment with a second input;

second logic for rotating an output of the adder by a number of bits specified by a predefined portion of the second input;

third logic for rotating an output of the calculator by a number of bits specified by a predefined portion of the first input;

fourth logic for combining an output of the second logic and an output of the third logic to form an output data block.

22. The system of claim 21 further comprising:

decryption logic; and a first shift register for shifting an output of the adder by a first predefined number of bits derived from an intermediate state of the decryption logic.

23. The system of claim 21, wherein at least one of the adder, the calculator, the first logic, the second logic, the third logic, and the fourth logic are implemented in software, the system further including a processor for executing the software.

24. The system of claim 21, wherein the predefined portion of the first input comprises lowest order bits of the first input, and wherein the predefined portion of the second input comprises lowest order bits of the second input.

25. The system of claim 21, wherein the predefined portion of the first input comprises about five lowest order bits of the first input, and wherein the predefined portion of the second input comprises about five lowest order bits of the second input.

26. The system of claim 21, wherein the first input and the second input comprise internal round state data of a block cipher.

27. The system of claim 26, wherein the first input comprises a first internal round state of the block cipher, and in which the second input comprises a second internal round state of the block cipher.

* * * * *